Oct. 20, 1970 JAMES E. WEBB 3,535,451
ADMINISTRATOR OF THE NATIONAL AERONAUTICS
AND SPACE ADMINISTRATION
MEANS FOR GENERATING A SYNC SIGNAL IN AN FM
COMMUNICATION SYSTEM
Filed Dec. 21, 1967 2 Sheets-Sheet 1

FREDERICK P. LANDAUER
*INVENTOR.*

BY D E Leslie
G. McCoy
ATTORNEYS

Oct. 20, 1970 JAMES E. WEBB 3,535,451
ADMINISTRATOR OF THE NATIONAL AERONAUTICS
AND SPACE ADMINISTRATION
MEANS FOR GENERATING A SYNC SIGNAL IN AN FM
COMMUNICATION SYSTEM

Filed Dec. 21, 1967 2 Sheets-Sheet 2

INVENTOR.
FREDERICK P. LANDAUER

BY [signature]

ATTORNEYS

United States Patent Office 3,535,451

Patented Oct. 20, 1970

3,535,451

MEANS FOR GENERATING A SYNC SIGNAL IN AN FM COMMUNICATION SYSTEM

James E. Webb, Administrator of the National Aeronautics and Space Administration, with respect to an invention of Frederick P. Landauer, Altadena, Calif.

Filed Dec. 21, 1967, Ser. No. 692,332
Int. Cl. H04n 1/36; H04l 27/10
U.S. Cl. 178—69.5 6 Claims

ABSTRACT OF THE DISCLOSURE

A circuit is provided for receiving each sync signal as frequencies in two narrow frequency bands which are adjacent to one another in the frequency spectrum. The two bands are transmitted in succession with a common transition time for both. The circuit includes a first channel which senses the signals in the first band and provides a first activating pulse of a duration which is longer than the duration during which signals in the first band are received. The circuit also includes a second channel which provides a second activating pulse when signals in the second band are detected. A sync indicating pulse is produced only when the two activating pulses occur in time coincidence.

ORIGIN OF THE INVENTION

The invention described herein was made in the performance of work under a NASA contract and is subject to the provisions of Sec. 305 of the National Aeronautics and Space Act of 1958, Public Law 85–568 (72 Stat. 435; 42 U.S.C. 2457).

BACKGROUND OF THE INVENTION

Field of the invention

This invention generally relates to data communication circuitry and, more particularly, to circuitry for detecting synchronizing signals which are used to decipher and/or correlate received data.

Description of the prior art

Synchronizing signals, often also referred to as sync pulses or sync words, are extensively used in data communication. In practice, they are injected into the stream of data transmitted to a receiver, wherein they are detected to separate blocks of data and/or to correlate them. For example, when video information is transmitted, sync pulses are used to align, such as in a horizontal direction, the video information contained in the signals between sync pulses, in order to produce a composite picture. The absence or presence of misalignment or jitter in the picture greatly depends on the accurate detection of the sync pulses.

In a frequency modulated (FM )communication system, such as is employed for video communication from space, the sync pulses are represented by frequencies which fall outside the frequency spectrum of the video information to be communicated. Generally, the video information falls between the FM carrier and the sync frequenices. In the receiver, a tuned RF filter is used to sense the presence of signals at the sync frequency and thereby detect the sync pulse.

The problem of accurately detecting sync pulses becomes more difficult as the overall system's signal-to-noise ratio decreases which is characteristic of a system used to communicate data from space. In such a system, noise spikes in the narrow band of the sync frequency cause ambiguous sync pulse detection, which greatly affects the proper deciphering of the data and/or the proper presentation of the video information.

OBJECTS AND SUMMARY OF THE INVENTION

Accordingly, it is an object of this invention to provide a new arramgement for detecting sync signals with greater accuracy than possible with prior art arrangements.

Another object is the provision of a new, relatively simple circuit for minimizing the effect of noise on the detection of sync signals.

Yet another object of this invention is to provide new means for recovering synchronizing signals in a system with relatively low signal-to-noise ratio.

Still a further object of this invention is the provision of a new method of recovering synchronizing signals in a FM video communication system with low signal-to-noise ratio.

Yet a further object of this invention is to provide means to recover synchronizing signals transmitted as part of, and together with FM video information.

These and other objects of the invention are achieved by transmitting, to a receiver, each sync signal as frequencies in two narrow frequency bands which are adjacent to one another in the frequency spectrum. The trailing edge in the first frequency band, hereafter referred to as the sync tip frequency, corresponds in time to the leading edge of the second frequency band, hereafter also referred to as the porch frequency. The receiver includes two narrow band detection channels, tuned to detect the sync tip and porch frequencies comprising each sync pulse. The two channels are interconnected in such a manner that only when the two sync-pulse-defining frequencies are received in the proper time relationship is an output pulse, representing a sync pulse, produced.

The novel features of the invention are set forth with particularity in the appended claims. The invention will best be understood from the following description when read in conjunction with the accompanying drawings.

DESCRIPTION OF THE PREFERRED EMBODIMENTS

The present invention will be described in conjunction with an FM communication system in which video information from black-to-white levels is transmitted at designated frequencies by a RF carrier. It should be noted however that this is to be considered as exemplary and not as a limitation upon the invention, which can be utilized in any FM communication system in which sync pulses are employed.

Figure 1:
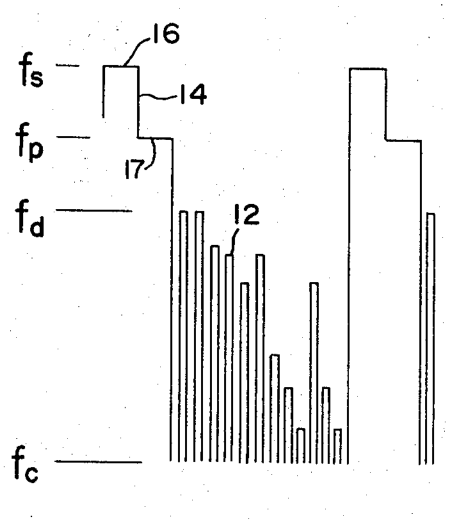
FIG. 1 is a simple diagram of frequency domains, useful in explaining an aspect of the invention.

Referring to FIG. 1, there is illustrated a frequency domain of a transmission channel in which it is assumed that a carrier frequency $f_c$ is used to carry video information of black-to-white levels represented by pulses 12. The video information falls in a frequency band between $f_c$ and $f_d$. In accordance with this invention, each sync pulse is transmitted as signals in two specific, very narrow frequency bands near the limit of the transmission channel. In FIG. 1, these bands are designated as having center frequencies $f_s$ and $f_p$ and hereafter are referred to as the sync tip and porch frequencies, respectively. Thus as seen, the video information falls between the FM carrier $f_c$ and the sync frequencies $f_s$ and $f_p$.

For each sync pulse, signals in the sync tip frequency, $f_s$ are transmitted immediately preceding signals in the porch frequency $f_p$. This produces a transition of interest, represented by line 14 which is common to both frequencies. That is, the trailing edge of signals in the sync tip frequency represented by line 16 corresponds in time to the leading edge of signals in the porch frequency, $f_p$ represented by line 17. Briefly stated, the leading edge of the sync tip frequency is utilized as a time reference for enabling the transition common to both to be used as a sync time reference.

Figure 2:
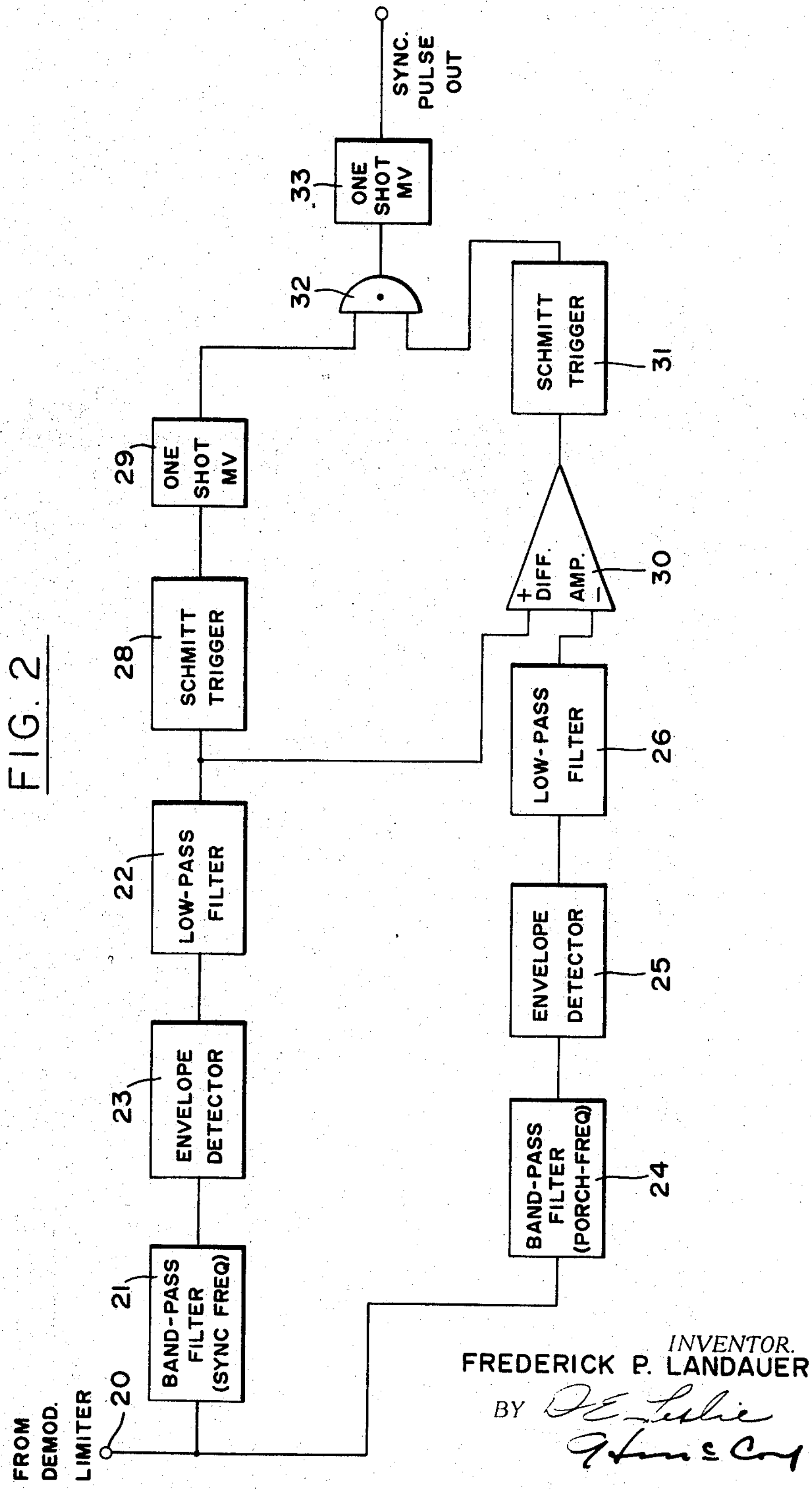
FIG. 2 is a block diagram of the present invention.

Reference is now made to FIG. 2 which is a block diagram of a circuit assumed to be included in a receiver to which a dual frequency sync pulse is transmitted. The circuit includes an input terminal 20 assumed to be connected to the receiver's demodulator limiter, so that the received signals at terminal 20 are of a constant amplitude. The use of a demodulator and limiter are well known in the art of radio communication.

Input terminal 20 is shown connected to a band-pass filter 21 assumed to be tuned to the frequency band $f_s$. Filter 21 is in turn connected to a low-pass filter 22 through an envelope detector 23. The band-pass filter 21, envelope detector 23 and low-pass filter 22 may be thought of as forming a first detection channel designed to provide an output signal at the output of filter 22, when signals in frequency band $f_s$ to which filter 21 is tuned, are received.

The circuit includes a second band-pass filter 24 which is connected to terminal 20. The filter 24 is tuned to the frequency band $f_p$. Filter 24 is connected to a low-pass filter 26 through an envelope detector 25. The three circuits 24, 25 and 26 form a second detection channel which provides an output signal upon the detection of signals in the frequency band $f_p$.

The output of filter 22 is supplied to a Schmitt trigger circuit 28 to trigger or fire a one shot multivibrator 29 whenever the level of the output signal of filter 22 exceeds a given level which occurs only when signals in the sync tip frequency band $f_s$ are received. The outputs of filters 22 and 26 are supplied to the plus (+) and minus (−) input terminals respectively of a differential amplifier 30, whose output is connected to a second Schmitt trigger 31. The circuit further includes an AND gate 32 which provides a true output only when inputs from the one shot 29 and Schmitt trigger 31 are supplied thereto, coincidentally in time.

Figure 3:
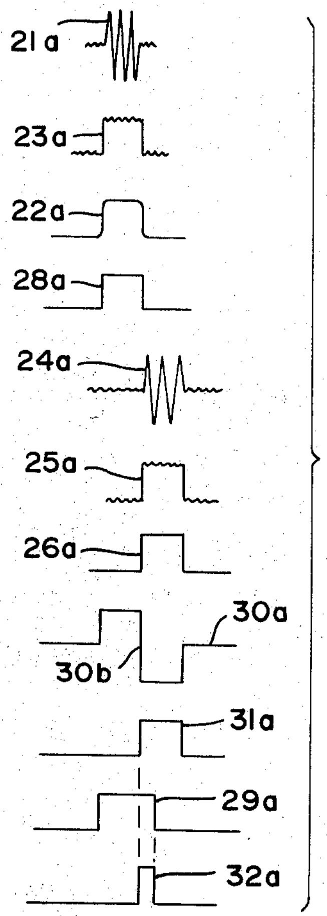
FIG. 3 is a diagram of waveforms of signals, produced in the various elements, shown in FIG. 2.

The operation of the circuit shown in FIG. 2 may best be explained by referring to FIG. 3 wherein are diagrammed the waveforms or shapes of various pulses or signals produced by the elements, shown in FIG. 2. The signals are designated by the numerals of the signal producing elements followed by the letter *a*. Thus, signals 21*a* and 23*a* represent the outputs of filter 21 and detector 23 respectively, etc. As seen, the output signals 22*a* and 26*a* are supplied to the plus (+) and minus (−) inputs of differential amplifier 30. The output thereof is signal 30*a*, with a transition 30*b* at which the signal changes from a positive to a negative level. This transition is sensed by Schmitt trigger 31, which produces pulse 31*a*.

Prior thereto, the output of Schmitt trigger 28 provides pulse 28*a*, which triggers the one shot 29 to provide pulse 29*a*. The duration or period of pulse 29*a* is greater than the duration during which the sync tip frequency is supplied. Thus, a short interval exists when both the one shot 29 and the Schmitt trigger provide true (assumed positive) pulses, i.e., 29*a* and 31*a*. These actuate AND gate 32 to provide the desired sync-indicating pulse 32*a*.

In the absence of signals in either frequency band $f_s$ or $f_p$, the inputs to amplifier 30 would be noise from the two detection channels. The noise may cause Schmitt trigger 31 to provide gate 32 with an activating signal. However, the absence of a signal from the one shot 29 would prevent the gate 32 from providing a true output. However, when a sync pulse is transmitted to, and received by, the receiver, the leading edge of signals in the band $f_s$ would cause the firing of the one shot 29, and supply the amplifier with the signal 22*a* from the filter 22. Then, when the transition common to both frequency bands occurs, the amplifier 30 is provided with signal 26*a* to produce transition 30*b*, so that its output triggers the Schmitt trigger 31 to provide the activating signal 31*a* to gate 32. Consequently, the gate is provided with two activating signals coincidentally in time, causing it to provide a true output 32*a*. This output may be used to trigger a one shot multivibrator 33, whose output is the actual sync pulse. The leading edge of such a pulse will only be provided during the transition common to both frequency bands, i.e., at a time when the trailing edge of signals in the frequency band $f_s$ and the leading edge of signals in the frequency band $f_p$ are received.

It should be noted that since the noise at the summing point input to the differential amplifier 30 is derived from two separate frequency domains $f_s$ and $f_p$, assumed to be of equal bandwidth but statistically from separate sources, the sum of the noise may be expressed as $\sqrt{A_n^2+B_n^2}$, where $A_n$ and $B_n$ represent noise in the signals, in the first and second channels, respectively. The noise sum is 3 db greater than the separate noise in each signal. However, the peak-to-peak signal is the sum of the two or 6 db greater than each separate signal. Thus, for a given signal-to-noise condition, jitter due to noise vs. rise time is 3 db less than would be the case without the amplifier 30. In brief, if the signal-to-noise ratio with one detection channel is 1, the two channel detection arrangement increases the signal-to-noise ratio to 2/2.

There has accordingly been shown and described herein a novel circuit for detecting sync pulses which are transmitted to the circuit as signals in two adjacent frequency domains with a transition common to both domains. It should be appreciated that those familiar with the art may make modifications and/or substitute equivalents in the arrangements as shown without departing from the spirit of the invention. Therefore, all such modifications and/or equivalents are deemed to fall within the scope of the invention as claimed in the appended claims.

What is claimed is:

1. In a system in which a sync pulse is transmitted to a receiver in the form of signals in a first frequency band, followed by signals in a second frequency band, a circuit in said receiver for providing an output signal representing said sync pulse, comprising:

a first detection channel responsive to the signals in said first frequency band for providing a first signal having leading and trailing edges in response thereto;

differential means having first and second inputs;

first means for applying said first signal to the first input of said differential means;

second means coupled to said first detection channel and responsive to said first signal for providing a first activating signal of a duration which is longer than the duration of said first signal;

a second detection channel responsive to the signals in said second frequency band for providing a second signal having leading and trailing edges in response thereto;

third means for applying said second signal to the second input of said differential means, whereby the output of said differential means changes from a first peak level to a second peak level when the leading edge of said second signal coincides in time with the trailing edge of said first signal;

fourth means coupled to said differential means and responsive to the change in the level of the output of said differential means for providing a second activating signal; and gating means for providing a sync-indicating signal only when said first and second activating signals are provided in time coincidence.

2. The circuit as recited in claim 1 wherein each of said first and second detection channels includes a narrow bandpass filter, an envelope detector and a lowpass filter, and said gating means is an AND gate.

3. In a receiver for receiving a sync pulse in the form of signals in a first frequency band, followed by signals in a second frequency band, a circuit for providing an output signal representing said sync pulse comprising:

a first detection channel to which said signals in said first frequency band are applied for providing a first signal of a preselected level, said first signal having leading and trailing edges;

a second detection channel to which signals in said second frequency band are applied for providing a second signal of a preselected level, said second signal having leading and trailing edges;

pulse generating means responsive to the leading edge of said first signal for providing a first activating pulse of a duration which is slightly longer than the duration during which signals in said first frequency band are received;

differential means coupled to said first and second detection channels and responsive to said first and second signals for providing an output with a defined level transition when said first and second signals are of a said preselected levels;

trigger means coupled to said differential means for providing a second activating pulse in response to the level transition in the output of said differential means; and gating means coupled to said pulse generating means and to said trigger means for providing an output signal representative of said sync pulse only when said first and second activating pulses are coincidentally supplied thereto.

4. The circuit as recited in claim 3 wherein said differentiating means comprises a differential amplifier for providing an output whose amplitude represents the difference of the levels of the two signals supplied to said differential means, and said trigger means comprises a Schmitt trigger for providing said second activating pulse when said second signal is applied to said differential amplifier.

5. The circuit as recited in claim 4 wherein said pulse generating means includes a one shot multivibrator for providing said first activating pulse.

6. The circuit as recited in claim 5 wherein said gating means comprises an AND gate to which the first and second activating pulses are supplied to provide a sync pulse indicating signal when supplied with said first and second activating pulses coincidentally in time.

References Cited

UNITED STATES PATENTS

| | | | |
|---|---|---|---|
| 1,824,635 | 9/1931 | Stocker. | |
| 2,401,405 | 6/1946 | Bedford | 178—69.5 |
| 2,519,911 | 8/1950 | Kuperus. | |
| 2,741,661 | 4/1956 | De France. | |
| 3,317,669 | 5/1967 | Ohnsorge | 178—69.5 |

ROBERT L. GRIFFIN, Primary Examiner

G. G. STELLAR, Assistant Examiner

U.S. Cl. X.R.

178—7.3